INVENTORS
PAUL B. QUENEAU
JOHN D. PRATER

3,834,893
COMBINED CHEMICAL TREATMENT AND FLOTATION PROCESS FOR RECOVERING RELATIVELY HIGH GRADE MOLYBDENITE FROM OFF GRADE OR LOW GRADE ORE MATERIALS
Paul B. Queneau and John D. Prater, Salt Lake City, Utah, assignors to Kennecott Copper Corporation, New York, N.Y.
Filed Mar. 26, 1969, Ser. No. 810,449
Int. Cl. C22b 1/06, 1/08, 3/00
U.S. Cl. 75—2  9 Claims

ABSTRACT OF THE DISCLOSURE

An off grade or low grade molybdenite ore material containing insoluble non-sulfide gangue as well as other impurities is treated by a combination of chemical and flotation steps to produce a molybdenite concentrate of commercially acceptable grade. The ore material, usually a molybdenite flotation concentrate, is subjected to roasting in the presence of concentrated sulfuric acid and is thereafter leached to remove soluble impurities, such as copper, iron, lead, and phosphorous. This treatment deactivates the insoluble non-sulfide mineral gangue, and makes it possible to selectively recover, by a subsequent flotation step, a molybdenite froth concentrate of commercially acceptable grade. Chlorine gas may be substituted for sulfuric acid during the roasting procedure, but with less satisfactory results.

BACKGROUND OF THE INVENTION

Figure 1:
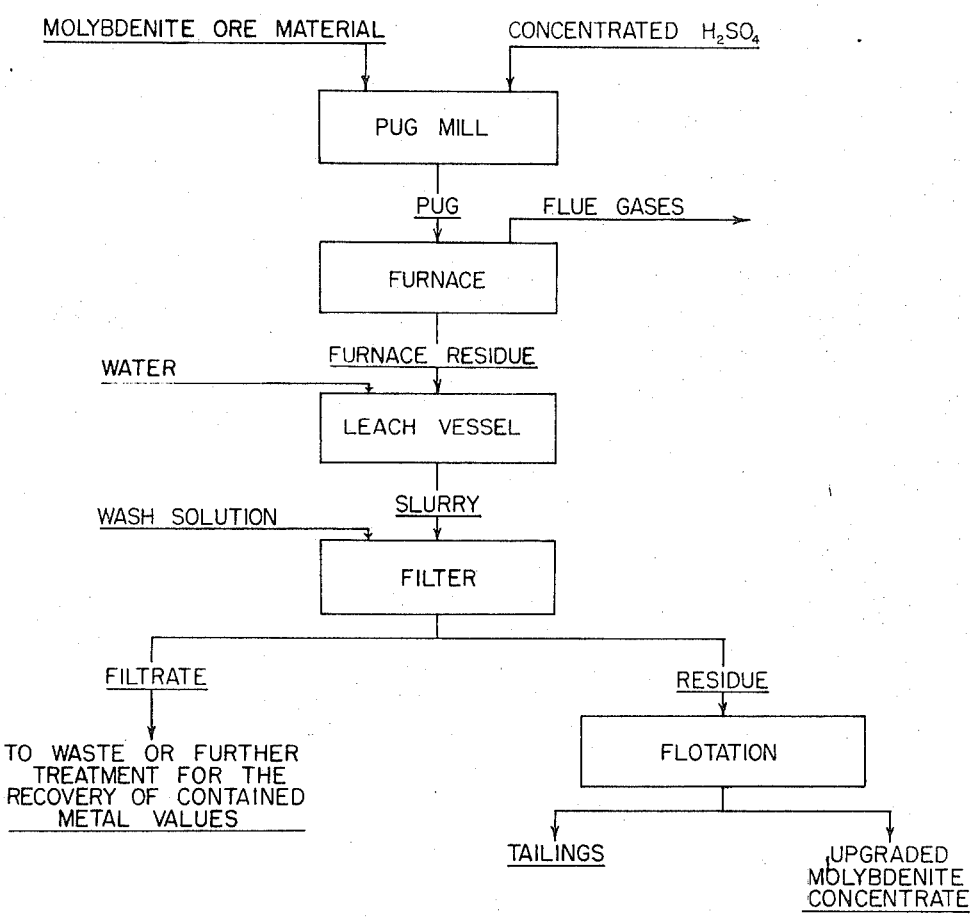

Field: This invention is related to processes for upgrading ore materials containing molybdenite, especially molybdenite flotation concentrates that are off grade or low grade.

State of the Art: Copper sulfide-molybdenite concentrates resulting from the beneficiation by froth flotation of copper sulfide ores containing molybdenite are customarily subjected to preliminary conditioning treatment, followed by re-flotation, to produce molybdenite concentrates of acceptable commercial grade for the production of molybdic oxide by the usual roasting methods. Sometimes the molybdenite concentrates obtained in this manner are off-garde and are subjected to further upgrading procedures.

U.S. Pat. No. 1,895,811 discloses a procedure whereby a molybdenite concentrate, off-grade as to the presence of significant amounts of copper and iron, is roasted in the presence of concentrated sulfuric acid to convert copper sulfide and iron sulfide impurities to the corresponding soluble sulfates. The thus-treated concentrate is then contacted with water to dissolve these sulfates. In this way, copper and iron impurities are removed so the final concentrate meets grade specifications. No indication is given that such treatment has any effect on insoluble non-sulfide gangue minerals, whereby a subsequent flotation step can be employed to advantage for the elimination of such insoluble non-sulfide gangue minerals, nor is there any teaching as to how to eliminate lead and phosphorous impurities.

Objectives: In the making of the present invention, the primary purpose was to produce molybdenite concentrates of commercially acceptable grade from off-grade or low grade concentrates heretofore untreatable by modern plant practices, due to the presence of excessive amounts of one or more contaminants, such as copper, lead, iron and phosphorous, as well as insoluble non-sulfide mineral gangue, such as siliceous minerals in the end product. Contrary to the patent noted above, which is concerned only with chemically upgrading a molybdenite concentrate that is off grade with respect to the presence of copper and iron sulfides, the present invention is concerned with overall purification of off grade or low grade molybdenite ore materials that contain significant amounts of insoluble non-sulfide mineral gangue.

SUMMARY OF THE INVENTION

In accordance with the invention the molybdenite ore material concerned, which may contain as much as 10% or more by weight of insoluble non-sulfide mineral gangue, is subjected to roasting, i.e. baking, in the presence of an oxidizing agent selected from the group consisting of concentrated sulfuric acid and chlorine gas. The roasted ore material is then leached with water, which becomes acidified upon contact with the calcine. If the oxidizing agent is sulfuric acid, then copper, iron and phosphorous are removed by the leaching step, but lead remains in the residue as lead sulfate. This is rapidly and effectively removed subsequently by a wash leach with hot aqueous chloride solution, such as dilute HCl. If the oxidizing agent is chlorine, then copper, iron, phosphorous, and lead are all removed by a single leach with dilute aqueous chloride solution. The leach residue, made up largely of purified molybdenite and non-sulfide mineral gangue, is then subjected to conventional flotation in the presence of the usual collector reagents for molybdenite. Because of the deactivation of the insoluble non-sulfide mineral gangue by the prior chemical purification treatment of the initial feed of molybdenite ore material, a clean froth concentrate of molybdenite is recovered as a commercially acceptable product.

It should be noted that the chemical processing appears to break the bond that otherwise exists between the molybdenite and the various contaminants, as well as deactivating the non-sulfide mineral gangue.

Although the present invention is applicable to any molybdenite ore material in which the molybdenite is associated with insoluble non-sulfide mineral gangue that tends to float with the molybdenite, it is particularly beneficial for treating molybdenite concentrates of the type presently discarded because of the difficulty of upgrading them by conventional procedures.

In carrying out the invention in its most preferred form, the molybdenite ore material is mixed with sulfuric acid in an amount sufficient to substantially completely convert the metallic sulfide impurities, particularly copper and iron, to the corresponding sulfates. The acid is desirably of 90 percent or more concentration to avoid introducing water to the process, although the use of less concentrated acid, e.g. 50 percent, is technically feasible inasmuch as the excess water is merely boiled off during the heating stage. The amount of acid required varies with the impurity content of the ore material, as well as with the temperature schedule of the roasting procedure. If acid-consuming minerals, such as calcite, are present in the concentrate, sufficient acid in excess of that required to treat the metallic sulfide impurities should be added to compensate. About 6 to about 10 grams of $H_2SO_4$ for each gram of the major contaminating metal values present in the ore material is a generally satisfactory amount of acid addition.

Although the preferred technique is to achieve substantially complete sulfation of the copper and iron sulfides by the acid roasting step, partial sulfation by use of a reduced quantity of acid is also very beneficial to subsequent flotation upgrading.

The acid ore material is heated preferably in a vented furnace for sufficient duration and at a sufficiently high temperature to convert as much as possible of the copper and iron sulfide minerals to copper sulfate and iron sulfate, but below that at which a significant quantity of $MoS_2$ will be oxidized. Below a temperature of 160° C. the sulfating of copper and iron occurs at a negligible rate, and above 300° C. molybdenite will oxidize at a rate determined by the particular material concerned. Increasing the temperature above 300° C. oxidizes molybdenite at an increasingly high rate. The material may be heated within a temperature range of 160° to 400° C. depending upon the particular material, although a range of about 200° to 290° C. is optimum.

Conversion of the copper and iron mineral impurities to soluble sulfates is usually substantially complete within from about one to four hours, depending upon the temperature, thickness of the bed, and other factors known to the art.

Heating times and temperatures in particular instances will depend upon the composition of the ore material and the furnace atmosphere. Higher temperatures increase the rates of reaction and reduce the time required for completion.

While it is desirable to vent the $SO_2$ gas generated by the roast to keep the furnace atmosphere oxidizing, no substantial benefit is realized by introducing oxygen to the furnace. Rabbling of the bed may be required to assist the $SO_2$ to escape from the reaction site at which it is formed. Rabbling is especially useful when the bed is thicker than about an inch.

The calcine is removed from the furnace and is subjected to a water leach to dissolve the sulfates formed by the roast. It has been found that most of any phosphorous impurity present is also dissolved. The water may be at any convenient temperature between ambient and boiling; it normally becomes acidified from contact with the ore material to a pH of somewhat below 2, which is sufficiently low to prevent re-precipitation of dissolved ferric ions.

After a short retention time, typically about 5 to about 10 minutes, depending upon the temperature and pH of the leach solution, the liquid phase of the resulting slurry usually contains a major portion of the soluble sulfates and of any phosphorous impurity present. The slurry is then filtered, the liquid phase being sent to waste or treated in conventional fashion for the recovery of contained values.

If the residue solids still contain an unacceptable concentration of soluble impurities, they may be leached or washed as required to further reduce the impurity level. In instances of the ore material feed containing a significant amount of lead sulfide, the residue solids are washed with a hot aqueous chloride solution (e.g. 40° C. to boiling) as previously indicated, to leach out the sulfated lead resulting from the roast.

The washed residue solids are normally sufficiently free from all impurities, except non-sulfide mineral gangue, to meet the grade requirements of the industry. This high degree of impurity removal is usually accompanied by a loss of less than about two percent of the molybdenite initially present in the ore material. Of great significance is the fact that the non-sulfide mineral gangue is deactivated by the chemical treatment, so that the molybdenite is readily separated therefrom as a froth concentrate by conventional flotation techniques.

For the flotation stage of the process, the residue solids are repulped with water; the pump is adjusted to an alkaline pH; normal dispersant, frother, and collector reagents for molybdenite are added; and upgrading is carried out by the usual flotation procedures to produce a molybdenite froth concentrate of commercially acceptable grade.

THE DRAWINGS

Figure 2:
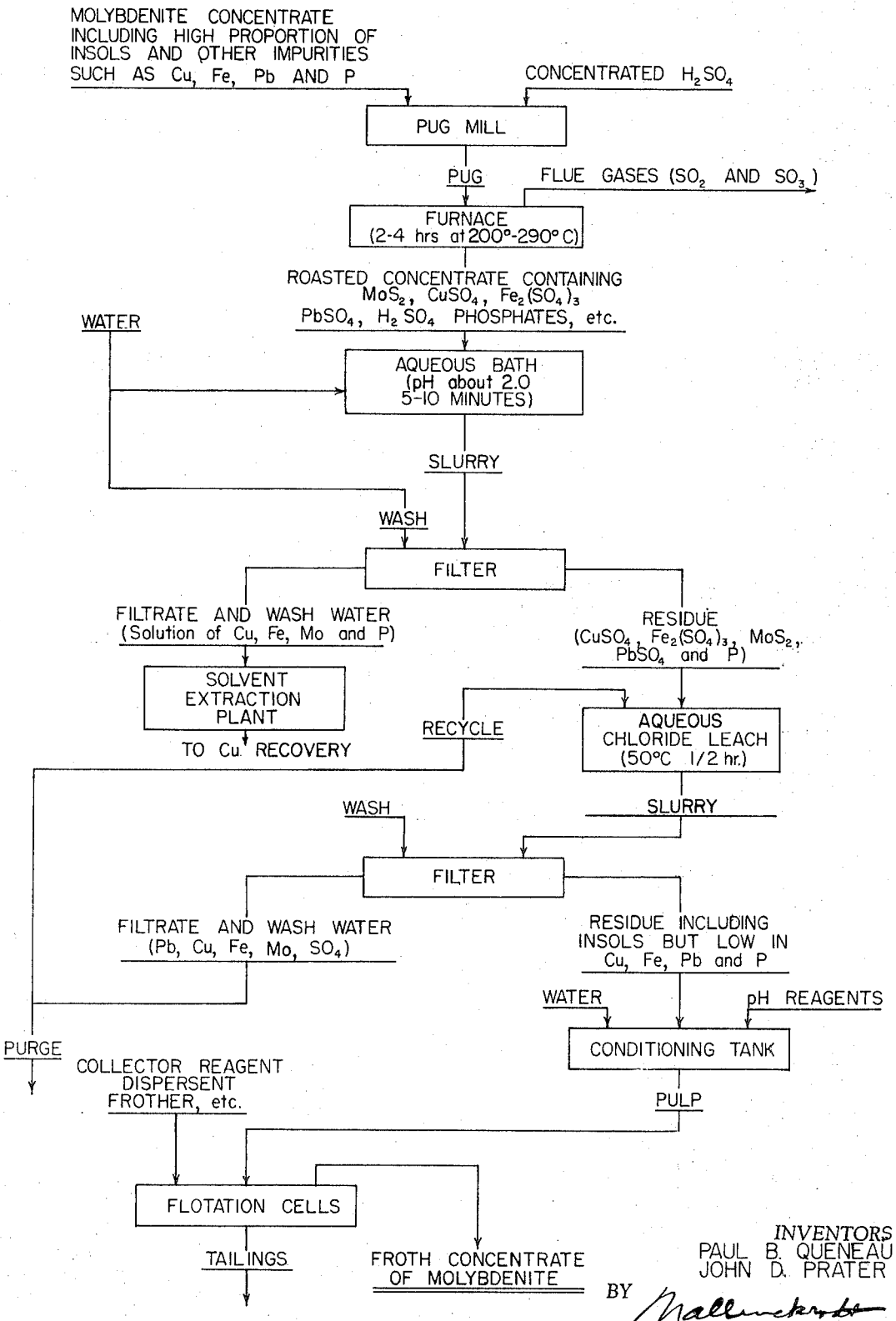

In the drawings, which illustrate procedures presently contemplated as the best mode of carrying out the invention;

FIG. 1 is a simplified flowsheet illustrating, in general, procedures employed in the use of concentrated sulfuric acid as the oxidant; and FIG. 2, a more detailed flowsheet with respect to a typical molybdenite concentrate obtained as a by-product of the milling of a copper porphyry ore containing a small percentage of molybdenite.

DETAILED DESCRIPTION OF THE ILLUSTRATED EMBODIMENTS

By the general procedure illustrated in FIG. 1, a molybdenite ore material of suitable mesh size for flotation purposes, constituting the feed, is mixed with concentrated sulfuric acid in a pug mill. The resulting mixture, i.e. pug, is roasted in a furnace, and the furnace residue is leached with dilute sulfuric acid. The slurry discharged from the leach vessel is filtered, the filtrate being sent to waste or treated in known manner for the recovery of contained metal values. The residue solids in the filter cake are repulped with water and are subjected to the usual froth flotation for the recovery of molybdenite as a relatively high grade molybdenite froth concentrate.

The process of the invention is illustrated in more detail in FIG. 2 with respect to a low-grade molybdenite concentrate that is normally unresponsive to upgrading by flotation. The feed concentrate is pugged with preferably concentrated sulfuric acid and introduced into a vented furnace for roasting, usually at a temperature between 200° and 290° C. for about 2 to about 4 hours. The roasted concentrate, containing $MoS_2$, $CuSO_4$,

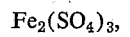
$$Fe_2(SO_4)_3,$$

$PbSO_4$, $H_2SO_4$, phosphates, and insoluble non-sulfide gangue minerals is introduced into a leach tank containing water that is preferably heated and that requires a pH of about 2 from contact with the material. A period of about 5 to about 10 minutes is sufficient to dissolve the soluble sulfates.

The resulting slurry is filtered and the residue solids washed. The filtrate and the wash water, which contain most of the copper, iron, and phosphorous impurities and essentially all of the molybdenum solubilized by the roast, are advantageously treated by solvent extraction techniques to recover the dissolved molybdenum. The raffinate is then treated for copper recovery as by cementation on metallic iron.

The filter cake of residue solids, which still contains essentially all of the $PbSO_4$ present in the roasted concentrate, is subjected to a hot, e.g. 50° C., chloride leach for about one-half hour. An aqueous solution of 325 grams per liter NaCl has proven very satisfactory. The leached residue solids are filtered and washed, with hot fresh leach solution and preferably then with water, the filtrate and washings being recycled to the leaching step.

The impurity level in the recycle stream is maintained below the prescribed acceptable limit by taking off a purge stream, as indicated.

The filter cake of residue solids from this second filtering operation, which retains substantially all of the insolubles introduced with the low-grade ore material, but very little copper, iron, lead, or phosphorous, is repulped with water to flotation density. The pH of the pulp is adjusted to the proper range for flotation and appropriately conditioned in the usual manner; whereupon it is subjected to flotation with an appropriate collector reagent for the molybdenite, which is floated and recovered as a froth concentrate of commercially acceptable grade for the product of molybdic oxide. The deactivated non-sulfide mineral gangue is depressed and eliminated as tailings.

Laboratory-scale tests were conducted on samples of different copper sulfide-molybdenite flotation concentrates containing excessive quantities of impurities, including considerable amounts of insoluble non-sulfide mineral gangue. The concentrates were mixed with concentrated sulfuric acid; the mixture was roasted in a vented furnace; the roast was washed with water and leached for 1 hour in the washings, which attained a temperature of 85° C. and a pH of 1.0; the solid phase of the resulting slurry was separated from the liquid phase and subjected to flotation.

The flotation stage of the tests involved repulping the leached residue solids to a pulp density within a range of 10 to 15 percent in a laboratory flotation cell. Sufficient lime, equivalent to from 10 to 12 pounds per ton of the feed material, was added to the flotation pulp to adjust its pH to between 11.4 and 11.8. The pulp was then conditioned for 5 minutes. The equivalent of from 2 to 3 pounds of sodium silicate per ton of the feed concentrate was then added to the pulp and the pulp conditioned for an additional minute. The equivalent of 5 to 6 pounds of burner oil per ton of the feed concentrate was added to the cell as a collector reagent for the molybdenite. The oil was added in at least two stages, followed in each instance with conditioning for two minutes. Sufficient methylamyl alcohol was added with each stage to obtain a satisfactory froth. A molybdenite froth concentrate was recovered over a period of from 6 to 8 minutes.

Details of the tests and metallurgical results are reported as follows:

TABLE I

Laboratory-scale tests ($H_2SO_4$ roast)

|  | I | II | III | IV |
|---|---|---|---|---|
| Feed concentrate, analysis (percent): |  |  |  |  |
| Mo | 31.5 | 31.5 | 15.0 | 29.3 |
| Cu | 2.25 | 2.25 | 2.25 | 1.01 |
| Fe | 5.40 | 5.40 | 8.00 | 7.75 |
| Insol | 29.3 | 29.3 | 52.1 | 23.5 |
| Acid roast: |  |  |  |  |
| Lbs. $H_2SO_4$ per lb. concentrate | 4.6 | 0.45 | 4.6 | 0.31 |
| Time, hours | 4.0 | 1.0 | 4.0 | 1.0 |
| Final bed temp., °C | 280 | 266 | 290 | 270 |
| Leach residue, analysis (percent): |  |  |  |  |
| Mo | 36.5 | 37.3 | 16.3 | 41.0 |
| Cu | 0.04 | 0.08 | 0.05 | 0.45 |
| Fe | 0.92 | 1.28 | 1.52 | 2.14 |
| Insol | 33.8 | 34.8 | 67.9 | 34.8 |
| Percent Mo recovery | 97.8 | 99.6 | 96.3 | 99.9 |
| Flotation concentrate, analysis (percent): |  |  |  |  |
| Mo | 55.7 | 50.8 | 46.3 | 49.5 |
| Cu | 0.03 | 0.08 | 0.03 | 0.11 |
| Fe | 0.15 | 0.63 | 0.65 | 1.15 |
| Insol | 8.08 | 14.5 | 23.1 | 16.7 |
| Percent Mo recovery | 99.4 | 96.9 | 96.2 | 98.9 |
| Overall Mo recovery | 97.2 | 96.5 | 92.6 | 98.8 |

The process described in connection with the drawings may, with minor modifications that will be apparent to a skilled metallurgist, use chlorine gas instead of sulfuric acid for the roasting procedure. The preferred roasting temperatures and other process considerations are not affected appreciably. Roasting may be done in any convenient vessel under a chlorine gas atmosphere, preferably by countercurrently contacting the heated molybdenite concentrate with the chlorine gas. Only the chloride leach is required.

Comparative, laboratory-scale tests on the same type of molybdenite ore material as for the first set of tests are reported in condensed form as follows:

TABLE II

Laboratory-scale comparative tests
($H_2SO_4$ roast vs. chlorine gas roast)

|  | Feed concentrate, percent | Molybdenite froth concentrate | | |
|---|---|---|---|---|
|  |  | Not roasted | $H_2SO_4$ roast | Chlorine gas roast |
| Mo | 31.5 | 35.5 | 55.7 | 44.5 |
| Insol | 29.3 | 27.8 | 8.1 | 20.3 |

From these tests it can be seen the flotation of the unrosated and unleached concentrate resulted in negligible upgrading. Acid roast and water leach prior to flotation produced a high grade molybdenite froth concentrate. Chlorine gas roast and water leach prior to flotation was better than no pre-treatment, but was not nearly as effecive as the sulfuric acid roast and accompanying water leach.

The effects of varying temperatures and times in the acid roast procedure are indicated by a series of tests on the same type of feed material assaying 0.6% copper, 1.0% Fe, and 52.8% Mo. Sulfuric acid in the amount of 0.16 pound per pound of concentrate was used in these tests, which are reported in the following table:

TABLE III

Varying times and temperatures ($H_2SO_4$ roast)

|  | Bed temp., °C | Time, hrs. | Copper residue assay | Percent Mo solubilized |
|---|---|---|---|---|
| 1 | 208 | 1 | .068 | .23 |
| 2 | 229 | 1.5 | .037 | .29 |
| 3 | 250 | 2.0 | .022 | .44 |
| 4 | 272 | 2.5 | .012 | .64 |
| 5 | 296 | 3.0 | .014 | 1.9 |

Pilot plant tests were also made. A typical test included roasting an off-grade molybdenite concentrate, mixed with concentrated sulfuric acid on the basis of 1.5 lbs. of acid per pound of concentrate, in a 6 inch stainless steel pipe 10 feet long equipped with a conveying screw for continuously moving material from the intake end of the pipe to the discharge end. The feed rate was 500 lbs. per day, and the residence time of material in the roaster 2 hours. A 2 lb. sample of the calcine resulting from the roast was leached with water that acquired a pH of 1.5, the leached residue solids were washed with water and were then leached with a 3% HCl solution at 85° C. for ½ hour for lead removal. Following washing of the residue solids from this second leach with boiling water and conditioning and flotation as in the other tests, a molybdenite froth concentrate of acceptable commercial grade was obtained. The results are reported in the following table:

TABLE IV

Pilot plant test ($H_2SO_4$ roast and lead removal)

| Constituent | Head assay | Assay after bake-leach | Assay after froth flotation,[1] percent |
|---|---|---|---|
| Mo | 23.0 | 37.2 | 53.6 |
| Cu | 4.2 | .085 | .03 |
| Fe | 12.5 | 2.0 | --- |
| Pb | .46 | .01 | .008 |
| P | .04 | .01 | --- |
| Insol | 25.2 | 32.5 | 11.0 |

[1] Overall Mo recovery = 96.4 percent.

Whereas this invention is here described with respect to preferred specific procedures, it should be realized that these are merely exemplary.

We claim:

1. A process for producing a relatively high grade molybdenite concentrate from a molybdenite ore material that has been processed by flotation to remove insoluble non-sulfide impurities, but that still contains a residue of such impurities which did not respond to the processing treatment, comprising roasting said ore material in the presence of an oxidizing agent selected from the group consisting of concentrated sulfuric acid and chlorine, and at a bed temperature below that at which a significant amount of molybdenum is oxidized but sufficiently high and for a sufficient time to convert metallic sulfide impurities to the corresponding sulfate or chloride salts;

subsequently contacting the calcine with an aqueous leach solution having sufficiently low pH and sufficiently high temperature to dissolve said salts;

separating the liquid phase of the resulting slurry from the solid phase thereof;

preparing the residue solids in the said solid phase for froth flotation;

subjecting the so-prepared residue solids to froth flotation in the presence of a collector reagent for molybdenite; and recovering the molybdenite as a froth concentrate substantially free of the said insoluble non-sulfide mineral gangue.

2. A process according to Claim 1, wherein the ore material is roasted at a bed temperature within the range of 160° to 400° C.

3. A process according to Claim 1, wherein the ore material is roasted at a bed temperature within the range of about 200° to about 290° C. to convert the metallic sulfide impurities to the corresponding sulfates.

4. A process according to Claim 1, wherein the ore material is roasted in the presence of concentrated sulfuric acid, and the calcine is first contacted with an aqueous leach solution to remove most of any soluble copper, iron, molybdenum, and phosphorous therein, and is then contacted with an aqueous chloride solution at elevated temperature to remove most of any soluble lead therein.

5. A process according to Claim 1, wherein the ore material is roasted in the presence of concentrated sulfuric acid and at a bed temperature within the range of about 200° to about 290° C. to convert the metallic sulfide impurities to the corresponding sulfates.

6. A process according to Claim 5, wherein the calcine is first contacted with an aqueous leach solution to remove most of any soluble copper, iron, molybdenum, and phosphorous therein, and the calcine is then contacted with an aqueous chloride solution at elevated temperature to remove most of any soluble lead therein.

7. A process according to Claim 1, wherein the ore material is roasted in the presence of chlorine, and the leach solution is an aqueous chloride solution at elevated temperature.

8. A process according to Claim 7, wherein the ore material is roasted at a bed temperature within the range of about 200° to about 290° C.

9. A process in accordance with Claim 1, wherein the molybdenite ore material is a copper sulfide-molybdenite ore flotation concentrate.

References Cited

UNITED STATES PATENTS

| | | | |
|---|---|---|---|
| 1,895,811 | 1/1933 | Morgan | 23—15 W |
| 2,055,613 | 9/1936 | Sessions | 75—112 X |
| 2,121,887 | 6/1938 | Sessions et al. | 75—115 |
| 2,718,455 | 9/1955 | McCormick | 75—2 X |
| 3,117,860 | 1/1964 | Bjerkerud et al. | 75—121 X |
| 3,466,169 | 9/1969 | Nowak et al. | 75—112 |
| 3,196,004 | 6/1965 | Kunda | 75—121 X |
| 2,083,031 | 6/1937 | Maclennan | 75—2 X |

ALLEN B. CURTIS, Primary Examiner

U.S. Cl. X.R.

75—112, 115, 121.